Aug. 2, 1955 W. W. K. VAN NORT 2,714,641
BRAKE FLUID INDICATOR
Filed Feb. 16, 1951 2 Sheets-Sheet 1

INVENTOR
WILLIAM W. K. VAN NORT
BY John A. Mawhinney
ATTORNEY

Aug. 2, 1955   W. W. K. VAN NORT   2,714,641
BRAKE FLUID INDICATOR
Filed Feb. 16, 1951   2 Sheets-Sheet 2
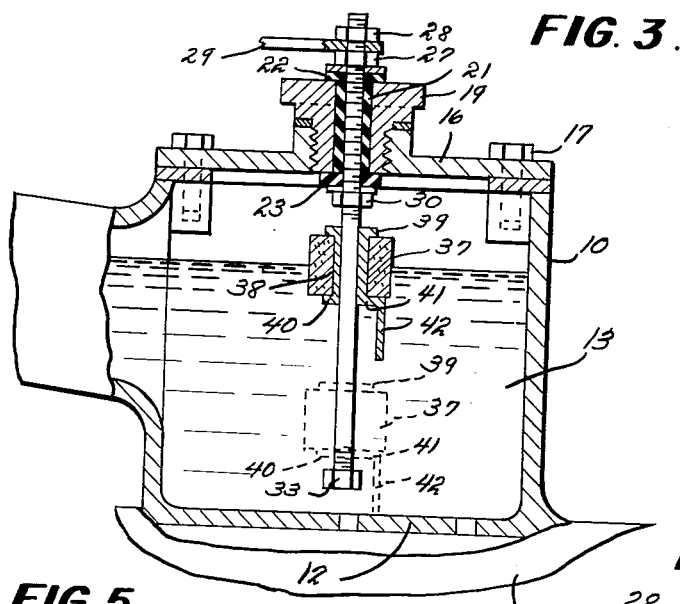
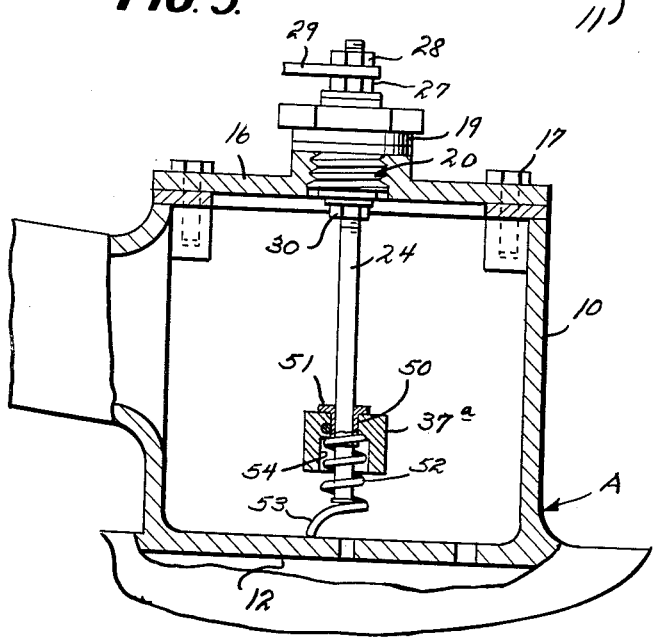
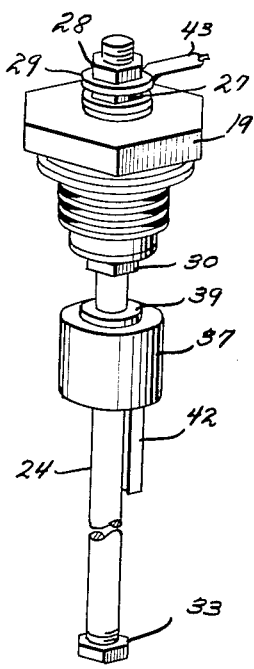
INVENTOR
WILLIAM W. K. VAN NORT
BY John A. Mawhinney
ATTORNEY

United States Patent Office 2,714,641
Patented Aug. 2, 1955

2,714,641

BRAKE FLUID INDICATOR

William W. K. Van Nort, Cabin John, Md.; Catherine H. Van Nort, executrix of said William W. K. Van Nort, deceased, assignor, by mesne assignments, to Harry Van Nort, Sebring, Fla.

Application February 16, 1951, Serial No. 211,296

5 Claims. (Cl. 200—84)

The present invention relates to an improvement in a brake fluid indicator and has for an object to provide a device of this kind which will warn the operator of an automobile or the like when the amount of brake fluid in the master cylinder has fallen below a predetermined level.

Another object of the present invention is to provide an improved brake fluid indicator which will remain inactive as long as the amount of brake fluid in the master cylinder is above a predetermined low level.

A further object of the present invention is to provide an improved device of this character in which a visible signal will be flashed on and off when the brake fluid has fallen below a predetermined level in the master cylinder and will burn steadily when the amount of fluid has become dangerously low.

The present invention aims to provide an improved brake fluid indicator which may be quickly and easily installed on all types of master cylinders of automobiles or the like.

The present invention also aims to provide an improved device of this kind which is economical to manufacture, comprises relatively few parts and is easy to maintain in operating condition.

With the foregoing and other objects in view, the invention will be hereinafter more fully described and more particularly pointed out in the appended claims.

Figure 1:
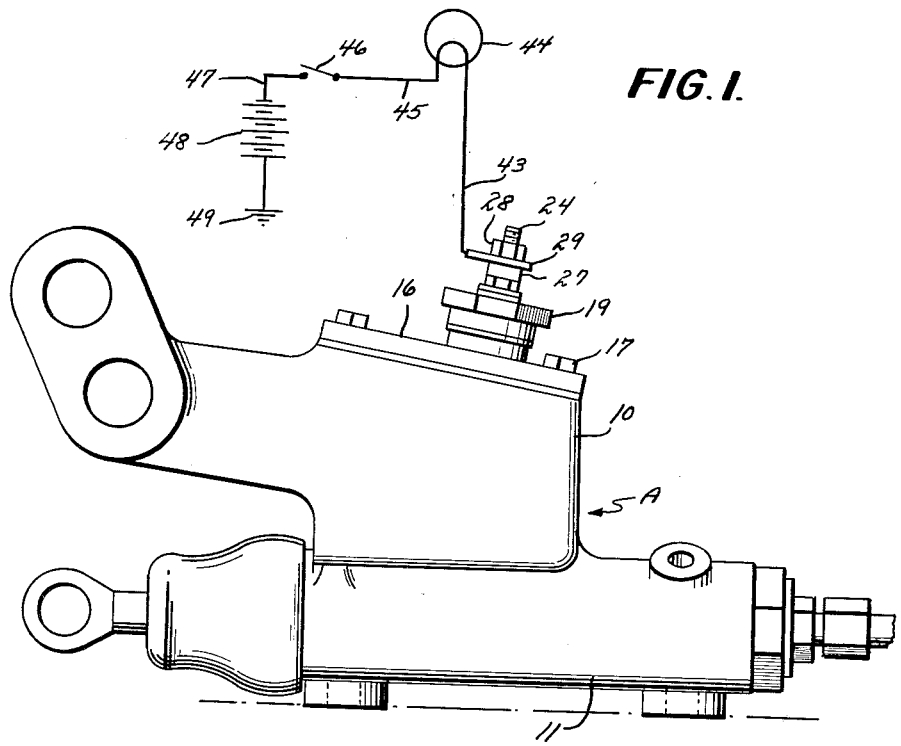
Figure 2:
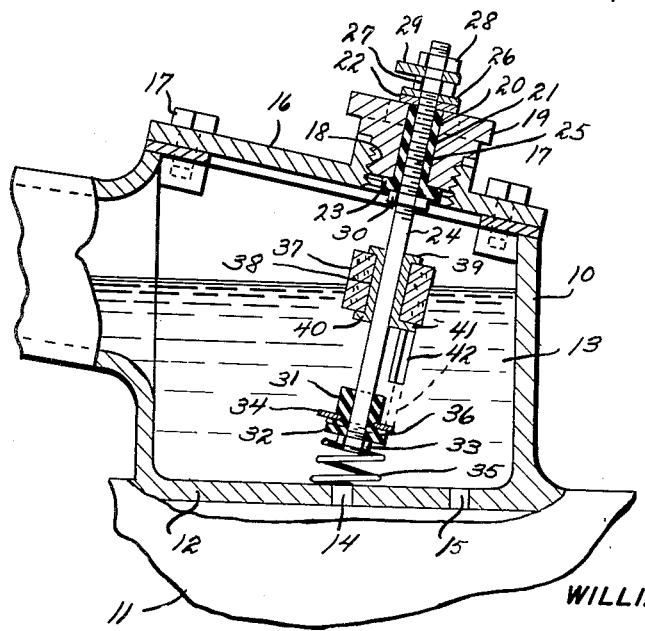

In the drawings, in which the same parts are denoted by the same reference numerals throughout the several views, Figure 1 is a side elevational view of a master cylinder of a hydraulically operated braking system with the improved brake fluid indicator applied thereto and showing diagrammatically the circuit therefor, Figure 2 is a fragmentary vertical sectional view of Figure 1 with parts broken away, Figure 3 is a view similar to Figure 2 showing a modification of the present invention, Figure 4 is a perspective view of the float and its mounting, and Figure 5 is a view similar to Figure 2 showing a further modification of the present invention.

Referring more particularly to the drawings, and especially to Figures 1 and 2, A generally indicates a conventional type of master cylinder of a hydraulically operated braking system of an automobile or the like. This master cylinder comprises a fluid reservoir 10 and a working cylinder 11 which are separated by a partition 12.

Brake fluid 13 is contained in the reservoir 10 and the partition 12 has the usual ports 14 and 15 for establishing communication between the reservoir 10 and the working cylinder 11. The upper edges of the side walls of the reservoir 10 are inclined to the horizontal so that the cover 16 of the reservoir is disposed at an inclination to the horizontal when secured to the reservoir 10 by screws or the like 17. The cover 16 is provided with the usual screw threaded filling opening 18 to receive the conventional externally screw threaded closure plug 19 having conventional vent openings.

The plug 19 is provided with a through bore 20 into which is fitted an insulating sleeve 21 which has at its upper end an annular flange 22 engaging the upper face of the plug 19. The sleeve 21 has an annular flange 23 at its lower end for engaging the lower face of the plug 19. A rod 24 is received by the sleeve 21 and extends above the plug 19 and into the reservoir 10 and has its lower end in spaced vertical relation to the partition 12.

The upper end portion of the rod 24 is screw threaded as indicated at 25. A washer 26 is received by the upper end portion of the rod 24 and rests upon the upper flange 22 of the sleeve 21. A nut 27 is threaded upon the upper end portion of the rod 24 and frictionally engages the washer 26.

A second nut 28 is received by the upper threaded end portion of the rod 24 and clamps an electric contact 29 between itself and the nut 27. A nut 30 is threadedly received by the lower end portion of the screw threads on the rod 24 and frictionally engages the lower flange 23 of the sleeve 21. The rod 24 is held against longitudinal and axial movement by the sleeve 21 and the nuts 27 and 30.

A bushing 31 of insulating material is positioned upon the lower end portion of the rod 24 and has an enlarged head 32. The lower end portion of the rod 24 is screw threaded to receive a nut 33 which engages the head 32 of the bushing 31 to retain it in position upon the rod 24. A contact disk 34 is mounted upon the bushing 31 which insulates the contact disk from the rod 24. The upper convolution of a coil spring 35 is received by an annular groove 36 formed in the head 32 of the bushing 31. The upper convolution of the spring 35 is at all times in electrical contact with the disk 34 and the lowermost convolution of the spring is at all times in electrical contact with the partition 12 of the master cylinder A.

A float 37 of any suitable material, such as plastic, aluminum or the like, has a through bore so that it may embrace the rod 24 for sliding movement thereon. A tubular member 38 which is made of electrical conducting material is disposed within the bore of the float 37. The upper edge portion of the tubular member 38 is crimped over to provide a flange 39 for engaging the upper surface of the float 37. The major part of the lower edge portion of the member 38 is cut away to provide substantially diametrically opposed tangs 40 and 41 which are bent outwardly into engagement with the lower face of the float 37. The flange 39 and the tangs 40 and 41 will prevent the escape of the contact member 38 from the float 37. The outer free end of the tang 41 is bent downwardly to provide a finger 42 which at times is adapted to engage the disk 34.

The electric contact 29 is attached to one end of a wire 43 and the opposite end of the wire 43 has connection with a conventional beam lamp 44 of the type used for indicating when the headlights of an automobile are burning. This lamp 44 may be positioned upon the instrument panel of the vehicle where it may be readily observed by the operator. A wire 45 has one end connected to the lamp 44 and its opposite end connected to the "on" side of the ignition switch 46 of the vehicle. A wire 47 has one end adapted to be contacted by the switch 46 and its opposite end connected to the battery 48 of the vehicle which in turn is grounded as indicated at 49.

It will be noted from the above description that the only change required to be made in the conventional master cylinder is that the usual closure plug 19 has a through passageway drilled therein.

In the use of the device, as long as the brake fluid 13 remains at a predetermined level such as is shown in Figure 2 of the drawings, the float 37 will be maintained at such a height that the contact finger 42 is held out of engagement with the disk 34 so that the circuit to the lamp 44 remains in open position. If the level of the brake fluid 13 in the reservoir 10 falls below the preedtermined level the float 37 will fall correspondingly and the contact finger 42 will move downwardly to the dotted line position shown in Figure 2 of the drawings. In this position of the finger 42 it will engage the disk 34 which is in contact with the spring 35 and the spring 35 is in turn in engagement with the partition 12 of the master cylinder A.

The master cylinder A is grounded upon the frame of the automobile. Since the contact member 38 is in engagement with the finger 42 and the rod 24, the circuit to the lamp will thereby be closed. If the fluid in the reservoir 10 has only fallen slightly below the predetermined level the float 37 will bob up and down in the fluid as the vehicle moves along over the road thereby periodically making a breaking contact between the disk 34 and the finger 42. This action will cause a flashing of the lamp 34 on and off to attract the attention of the operator of the vehicle to warn him that the brake fluid has fallen below the predetermined level.

In the event that the brake fluid becomes nearly exhausted or dangerously low in the reservoir 10, the float will remain constantly in the down position since there will not be sufficient fluid in the reservoir to cause the float to be buoyed upwardly. In this case the contact finger 42 will remain constantly in contact with the disk 34 and the circuit to the lamp 44 will be maintained continuously in closed position so that the lamp 44 will burn continuously. The operator of the vehicle will therefore be warned that the amount of fluid in the reservoir is dangerously low and needs immediate attention.

The form of the invention illustrated in Figures 3 and 4 is substantially the same as that shown in Figures 1 and 2 of the drawings.

In Figure 3 the upper edges of the walls of the reservoir 10 lie in substantially the same horizontal plane so that the cover 16 is not inclined to the horizontal. In this form of the invention the bushing 31, the disk 34 and the coil spring 35 are dispensed with and the nut 33 prevents the float 37 from escaping from the lower end of the rod 24. The contact finger 42 engages directly with the partition 12 to close the circuit when the fluid 13 falls below a predetermined level. The operation of this form of the invention is the same as that described in connection with Figures 1 and 2 of the drawings.

In the form of the invention illustrated in Figure 5 of the drawings, a float 37a is mounted for sliding movement on the rod 24. An electric contact member 50 in the form of a tube having an annular flange 51 at its upper end for engaging the upper face of the float 37a is disposed around the rod 24 and between the rod and the float. The free end portion of the uppermost convolution of a coiled contact spring 52 is embedded in the float 37a and the free end portion of the lowermost convolution of the spring 52 is bent downwardly as is indicated at 53 to engage the partition 12 of the master cylinder A when the fluid in the reservoir 10 falls below a predetermined level. The lower portion of the float 37a has an enlarged bore as indicated at 54 for receiving the spring 52 and permitting free movement of the spring.

The operation of this form of the invention is substantially the same as that described above in connection with the form of the invention shown in Figures 1 and 2 of the drawings.

It is obvious that various changes and modifications may be made in the details of construction and design of the above specifically described embodiment of this invention without departing from the spirit thereof, such changes and modifications being restricted only by the scope of the following claims.

What I claim is:

1. An actuating float device responsive to low liquid level comprising a supporting element mounted on a liquid chamber containing liquid and having its upper end portion extending thereabove for connection to a source of electrical energy and its lower end portion disposed in the liquid in the chamber, a float slidably mounted on said supporting element and disposed in the liquid in the chamber, an electric contact on said float and in electrical contact at all times with said supporting element, said electrical contact adapted to have electrical contact with said chamber only when the liquid in the chamber falls below a predetermined level, means disposed below the float for preventing escape of the float from the supporting element, said escape preventing means comprising the electric contact on the float.

2. An actuating float device as claimed in claim 1 characterized by the fact that an insulated bushing is mounted on the lower end portion of the supporting element, that an electrical contact disk is carried by said bushing, that a spring has one end attached to said bushing and in electrical contact with said disk and its opposite end in electrical contact with the chamber and that said disk is disposed in the path of downward movement of the electrical contact member which is carried by the float.

3. An actuating float device responsive to low fluid level and adapted for use in a hydraulic braking system of an automobile or the like having a reservoir containing brake fluid and provided with a filling closure plug comprising a rod adapted to be mounted on said plug and having one end portion extending outwardly of said plug and its other end portion extending into the fluid in the reservoir, means carried by said rod adapted to prevent axial and rotative movement of the rod with respect to said plug, an electrical contact on the upper extended end portion of said rod, a float slidably mounted directly on said rod and adapted to be disposed in the brake fluid, an electrical contact carried by said float in electrical contact therewith at all times and adapted to have electrical contact with the reservoir only when the float sinks due to a falling of the brake fluid below a predetermined level, means disposed below the float for preventing escape of the float from the supporting element, said escape preventing means comprising the electric contact on the float.

4. An actuating float device responsive to low fluid level and adapted for use with a hydraulic braking system of an automobile having a reservoir containing brake fluid provided with a filling closure plug having a through passageway comprising an insulated sleeve adapted to be mounted in the passageway of the plug, a rod received by said sleeve and having one end portion extending above said plug and its opposite end portion extending into the fluid in the reservoir, means carried by said rod adapted to secure the rod to the plug, a float slidably mounted on said rod and disposed in the brake fluid in the reservoir, an electrical contact member surrounding and in engagement with said rod, said contact member having a flange engaging the upper surface of said float and a pair of tangs engaging the lower surface of said float, a finger on said contact member adapted to engage the bottom of the reservoir when the float approaches the lower end of said rod, the lower end of said rod being vertically spaced from the bottom of the reservoir, and a nut mounted on the lower end of said rod for preventing the escape of the float therefrom.

5. An actuating float device responsive to low fluid level and adapted for use with a hydraulic braking system of an automobile having a reservoir containing brake fluid provided with a filling closure plug having a through passageway comprising an insulated sleeve adapted to be mounted in the passageway of the plug, a rod received by said sleeve and having one end portion extending above said plug and its opposite end portion extending into the brake fluid in the reservoir, means carried by said rod adapted to secure the rod to the plug, a float slidably mounted on said rod and disposed in the brake fluid in the reservoir, an electrical contact member surrounding and in engagement with said rod, said contact member having a flange engaging the upper surface of said float, and a coil contact spring embracing said rod and having its upper end secured to said float and in engagement with said contact member, the lower end portion of said spring being bent downwardly to engage the bottom of the reservoir when the float has slid downwardly on said rod due to the brake fluid falling below a predetermined level in the reservoir.

References Cited in the file of this patent

UNITED STATES PATENTS

| | | |
|---|---|---|
| 106,141 | Duryea | Aug. 9, 1870 |
| 460,895 | Smith | Oct. 6, 1891 |
| 666,451 | Zimmermann | Jan. 22, 1901 |
| 2,076,454 | Foxwell | Apr. 6, 1937 |
| 2,161,441 | Vickers | June 6, 1939 |
| 2,180,884 | Silvestri et al. | Nov. 21, 1939 |
| 2,184,755 | Pratt | Dec. 26, 1939 |
| 2,260,312 | Gruman | Oct. 28, 1941 |
| 2,479,503 | Moore | Aug. 16, 1949 |
| 2,615,105 | Whitney | Oct. 21, 1952 |